United States Patent
Kim et al.

(10) Patent No.: US 11,623,308 B2
(45) Date of Patent: *Apr. 11, 2023

(54) AUTO-PRESSING JIG APPARATUS FOR PRESSING ELECTRODE LEAD TO BUSBAR

(71) Applicant: LG ENERGY SOLUTION, LTD., Seoul (KR)

(72) Inventors: Kyung-Mo Kim, Daejeon (KR); Jeong-O Mun, Daejeon (KR); Jin-Yong Park, Daejeon (KR); Jung-Hoon Lee, Daejeon (KR); Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 297 days.

This patent is subject to a terminal disclaimer.

(21) Appl. No.: 16/767,947

(22) PCT Filed: Apr. 2, 2019

(86) PCT No.: PCT/KR2019/003895
§ 371 (c)(1),
(2) Date: May 28, 2020

(87) PCT Pub. No.: WO2020/004780
PCT Pub. Date: Jan. 2, 2020

(65) Prior Publication Data
US 2020/0290162 A1    Sep. 17, 2020

(30) Foreign Application Priority Data
Jun. 29, 2018  (KR) .......................... 10-2018-0075762

(51) Int. Cl.
*B23K 37/04* (2006.01)
*H01M 50/50* (2021.01)
(Continued)

(52) U.S. Cl.
CPC ............. *B23K 37/04* (2013.01); *H01M 50/50* (2021.01); *H01M 50/505* (2021.01); *H01M 50/516* (2021.01)

(58) Field of Classification Search
CPC ............... H01M 50/50–60; B23K 37/04–0461
(Continued)

(56) References Cited

U.S. PATENT DOCUMENTS

2015/0228942 A1  8/2015  Shimoda et al.
2017/0331097 A1  11/2017  Lee et al.
(Continued)

FOREIGN PATENT DOCUMENTS

CN    106181182 A    12/2016
CN    207171311 U    4/2018
(Continued)

OTHER PUBLICATIONS

International Search Report for PCT/KR2019/003895 dated Jul. 19, 2019.
(Continued)

*Primary Examiner* — Matthew T Martin
*Assistant Examiner* — Katharine A Caughron
(74) *Attorney, Agent, or Firm* — Birch, Stewart, Kolasch & Birch, LLP

(57) ABSTRACT

Disclosed is an automatic pressing jig apparatus including a plurality of pressing units configured to simultaneously press a plurality of bus bars provided in the battery module, the plurality of pressing units pressing an end portion of a lead assembly from an upper portion of the bus bar so that the lead assembly does not protrude through a lead slit of a bus bar among the plurality of bus bars; a support plate connected to one end portion of the plurality of pressing units to support the plurality of pressing units; and a distance adjusting unit connected to the support plate to move the
(Continued)

support plate so that the plurality of pressing units are moved away from or closer to the battery module.

11 Claims, 9 Drawing Sheets

(51) Int. Cl.
 *H01M 50/516* (2021.01)
 *H01M 50/505* (2021.01)
(58) Field of Classification Search
 USPC ... 228/212–213, 44.4, 44.7, 47.1, 49.1, 49.5
 See application file for complete search history.

(56) References Cited

U.S. PATENT DOCUMENTS

2018/0277807 A1* 9/2018 Lorentz ............... H01M 50/502
2019/0386283 A1* 12/2019 Lee ..................... H01M 50/502

FOREIGN PATENT DOCUMENTS

| | | | |
|---|---|---|---|
| CN | 207239349 | U | 4/2018 |
| JP | 2007-109548 | A | 4/2007 |
| JP | 2012-109275 | A | 6/2012 |
| JP | 2018-6215 | A | 1/2018 |
| KR | 10-2012-0064800 | A | 6/2012 |
| KR | 10-2012-0065279 | A | 6/2012 |
| KR | 10-2015-0038930 | A | 4/2015 |
| KR | 10-2015-0047563 | A | 5/2015 |
| KR | 10-2015-0125387 | A | 11/2015 |
| KR | 10-2015-0130047 | A | 11/2015 |
| KR | 10-2016-0077765 | A | 7/2016 |
| KR | 10-2017-0068145 | A | 6/2017 |
| KR | 10-1750597 | B1 | 6/2017 |
| WO | WO 2017/146369 | A1 | 8/2017 |

OTHER PUBLICATIONS

Extended European Search Report for European Application No. 19826720.5 dated Jun. 4, 2021.

* cited by examiner

AUTO-PRESSING JIG APPARATUS FOR PRESSING ELECTRODE LEAD TO BUSBAR

TECHNICAL FIELD

The present disclosure relates to an automatic pressing jig apparatus for closely adhering an electrode lead to a bus bar, and more particularly, to an automatic pressing jig apparatus used to closely adhere electrode lead assemblies of a plurality of battery cell stack groups to a bus bar simultaneously.

The present application claims priority to Korean Patent Application No. 10-2018-0075762 filed on Jun. 29, 2018 in the Republic of Korea, the disclosures of which are incorporated herein by reference.

BACKGROUND ART

In a conventional battery module, a bus bar is used for electrically connecting stacked battery cells to each other, and a plurality of electrode leads respectively drawn out from the plurality of battery cells are bent and positioned on the bus bar, followed by welding.

If the battery module is manufactured in this way, in a state where the bent electrode lead is positioned on the bus bar, the electrode lead is pressed toward the bus bar by using a jig so that the electrode lead is closely adhered to the bus bar, and then laser is irradiated onto the electrode lead to perform welding thereto.

Referring to FIGS. 1 and 2, there is shown a conventional battery module in which a plurality of pouch-type battery cells are electrically connected by a bus bar.

The conventional battery module is manufactured by inserting each electrode lead 2 drawn from a plurality of pouch-type battery cells 1 into a lead slit 4 of a bus bar 3 as shown in FIG. 1, and then bending the inserted electrode lead 2 to be closely adhered to the bus bar 3 and then performing welding thereto as shown in FIG. 2.

However, in the conventional battery module as described above, in addition to the process of inserting the electrode lead 2 into the lead slit 4 of the bus bar 3 and the process of welding the electrode lead 2 to the bus bar 3, the process of bending the electrode lead 2 is additionally required, which makes the process complicated.

In addition, if the cell applied to the battery module is a pouch-type cell, as the cell has a smaller thickness, the electrode lead is also manufactured to have a shorter length. If the electrode lead is shortened as above, the bonding area between the electrode lead and the bus bar is also reduced to lower the bonding strength, thereby increasing the possibility of product failure.

Thus, it is required to develop a battery module structure in which the electrode lead bending process may be omitted, and accordingly, a new pressing jig for welding, which is suitable for the bonding structure of the electrode lead and the bus bar is also required.

DISCLOSURE

Technical Problem

The present disclosure is designed to solve the problems of the related art, and therefore the present disclosure is directed to providing an automatic pressing jig apparatus, which may press a bus bar at both sides so that the bus bar is welded to an electrode lead in close contact with each other, in manufacturing a battery module in which the electrode lead is coupled to the bus bar by welding without being bent for the coupling with the bus bar.

In addition, the present disclosure is directed to providing an automatic pressing jig apparatus, which may closely adhere electrode lead assemblies of a plurality of battery cell stack groups to a bus bar through just one process at several spots such that the electrode lead assemblies are closely adhered to the bus bar with a constant force.

Moreover, the present disclosure is directed to providing an automatic pressing jig apparatus, which may closely adhere electrode lead assemblies of a plurality of battery cell stack groups to a bus bar such that the bus bar has the same surface as the electrode lead assemblies.

However, the technical problem to be solved by the present disclosure is not limited to the above, and other objects not mentioned herein will be clearly understood by those skilled in the art from the following description.

Technical Solution

In one aspect of the present disclosure, there is provided an automatic pressing jig apparatus for closely adhering a bus bar and a lead assembly provided in a battery module to each other, the automatic pressing jig apparatus comprising: a plurality of pressing units configured to simultaneously press a plurality of bus bars provided in the battery module, the pressing units pressing an end portion of the lead assembly from an upper portion of the bus bar so that the lead assembly does not protrude through a lead slit of the bus bar; a support plate connected to one end portion of the pressing unit to support the plurality of pressing units; and a distance adjusting unit connected to the support plate to move the support plate so that the plurality of pressing units are moved away from or closer to the battery module.

The automatic pressing jig apparatus may further comprise an insulating plate interposed between the support plate and the pressing unit.

The pressing unit may include: a support frame configured to move downward by the distance adjusting unit to press the bus bar at both sides thereof; and a pressing frame located inside the support frame and configured to move downward along with the support frame by the distance adjusting unit to press the end portion of the lead assembly protruding through the lead slit of the bus bar The pressing unit may further include an elastic member interposed between the support frame and the pressing frame to maintain a distance between the pressing frame and the support frame, the elastic member being compressed when the pressing frame presses the lead assembly.

The automatic pressing jig apparatus may further comprise: a fixing rod having one side coupled through the support frame and the other side connected to the support plate; and a guide rod having one side connected to the pressing frame and the other side inserted into the fixing rod to guide movement of the elastic member.

The support frame may include a pair of bus bar pressing portions configured to press the bus bar at both sides thereof when the support frame moves downward due to the movement of the distance adjusting unit.

The bus bar pressing portions may have a tapered shape so that a distance between the pair of bus bar pressing portions decreases in an upper direction.

The pressing frame may include a lead pressing portion configured to press the lead assembly from the above so that the lead assembly does not protrude through the lead slit of the bus bar when the pressing frame moves downward due to the movement of the distance adjusting unit.

The support frame may have a first opening formed through a center thereof, and the pressing frame may have a second opening formed at a location corresponding to the lead assembly and communicating with the first opening.

The lead pressing portion may include a pair of horizontal bars spaced apart from each other and extending in parallel and a barrier configured to connect centers of the pair of horizontal bars, and the horizontal bars may press the lead assembly.

A distance between outer edge portions of the pair of horizontal bars may be identical to or shorter than a width of the lead assembly Advantageous Effects According to an embodiment of the present disclosure, the bus bar may be welded to an electrode lead in close contact with each other, in manufacturing a battery module in which the electrode lead is coupled to the bus bar by welding without being bent for the coupling with the bus bar.

In addition, according to another embodiment of the present disclosure discloses, the electrode lead assemblies of the plurality of battery cell stack groups may be closely adhered to the bus bar through just one process at several spots, and thus the electrode lead assemblies may be closely adhered to the bus bar with a constant force.

Moreover, according to another embodiment of the present disclosure discloses, when the electrode lead assemblies of the plurality of battery cell stack groups are closely adhered to the bus bar, the bus bar may have the same surface as the electrode lead assemblies, and thus the electrode lead assemblies do not protrude out of the surface of the bus bar, thereby improving the welding quality.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall configuration of a system for manufacturing a battery module according to an embodiment of the present disclosure will be described with reference to FIGS. 3 to 5.

Figure 1:
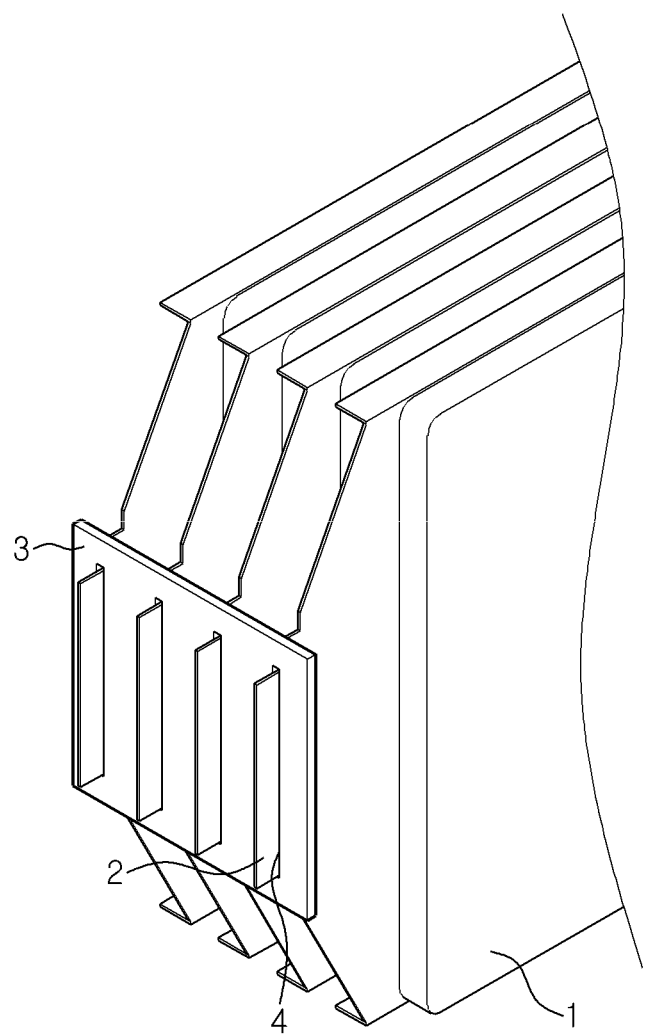
FIGS. 1 and 2 are diagrams for illustrating a process of coupling an electrode lead and a bus bar, in manufacturing a conventional battery module.
Figure 2:
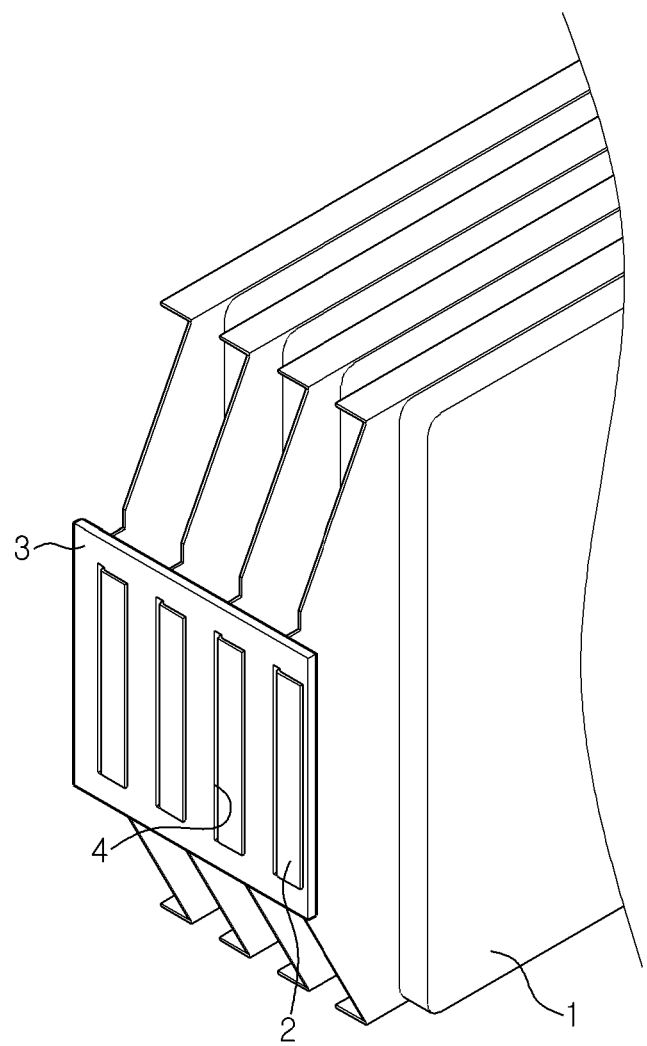
Figure 3:
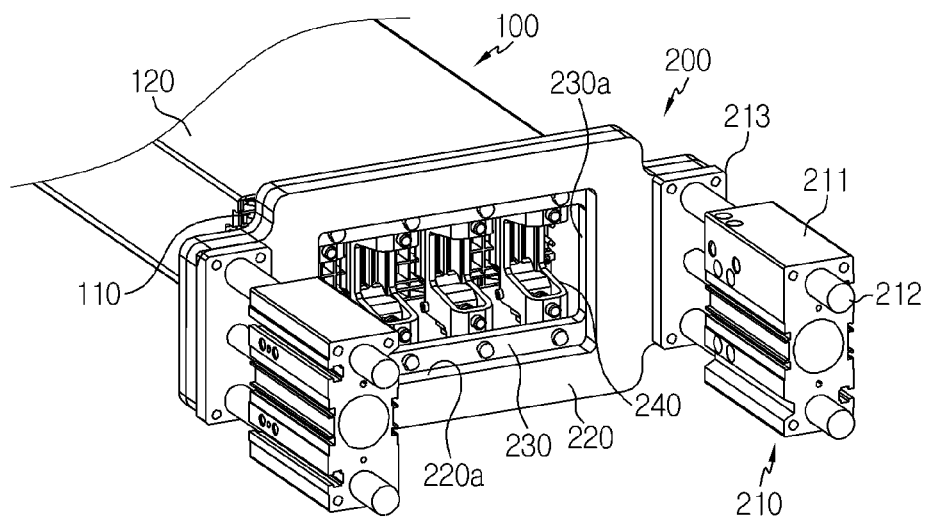
FIG. 3 is a diagram showing that the automatic pressing jig apparatus according to an embodiment of the present disclosure is coupled to a battery module.
Figure 4:
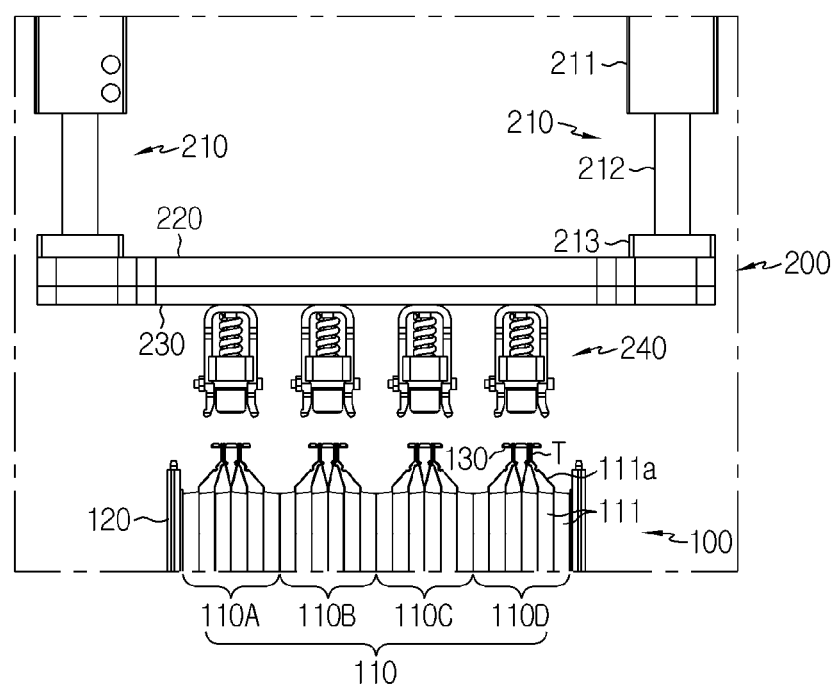
FIGS. 4 and 5 are diagrams showing states before and after a bus bar of the battery module is pressed by the automatic pressing jig apparatus according to an embodiment of the present disclosure.
Figure 5:
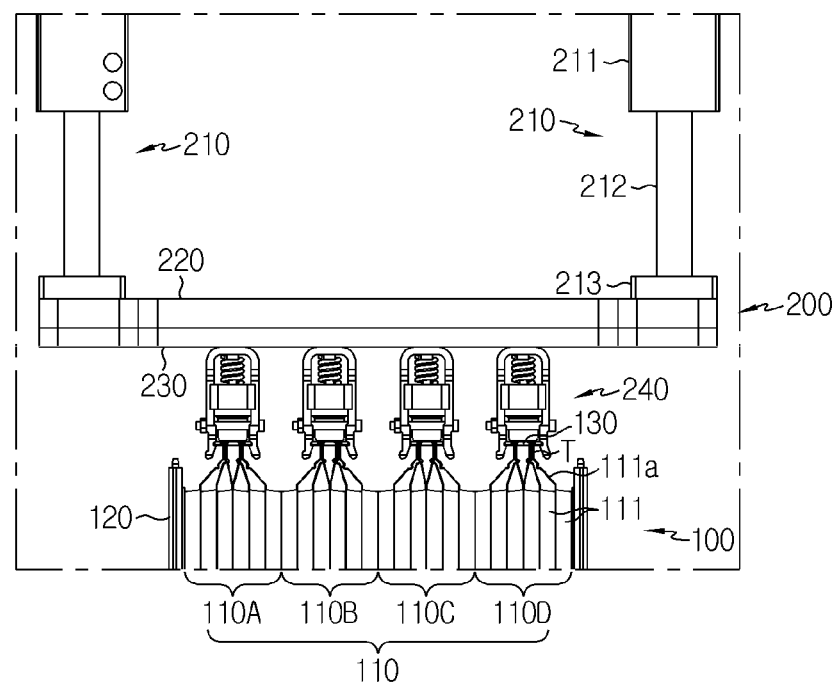

FIG. 3 is a diagram showing that the automatic pressing jig apparatus according to an embodiment of the present disclosure is coupled to a battery module, and FIGS. 4 and 5 are diagrams showing states before and after a bus bar of the battery module is pressed by the automatic pressing jig apparatus according to an embodiment of the present disclosure.

Referring to FIGS. 3 to 5, the system for manufacturing a battery module according to an embodiment of the present disclosure includes a battery module 100 and an automatic pressing jig apparatus 200 disposed at one side of the battery module 100.

The battery module 100 includes a cell stack 110, a module case 120 for accommodating the cell stack 110, and a bus bar 130 that contacts a lead assembly T drawn from the cell stack 110.

The cell stack 110 includes a plurality of unit cell stacks 110A to 110D. In the figures of the present disclosure, it is just illustrated that the cell stack 110 includes a first unit cell stack 110A, a second unit cell stack 110B, a third unit cell stack 110C and a fourth unit cell stack 110D. However, the number of unit cell stacks is not limited thereto, and two or more unit cell stacks may be provided without limitation.

Each of the unit cell stacks 110A to 110D is formed by stacking a plurality of battery cells 111 to face each other, and each of the battery cells 111 stacked to form one unit cell stack has an electrode lead 111a.

The electrode leads 111a provided in the battery cells 111 of any one unit cell stack 110A to 110D are collected into one or more groups, thereby forming one or more lead assemblies T.

Figure 9:
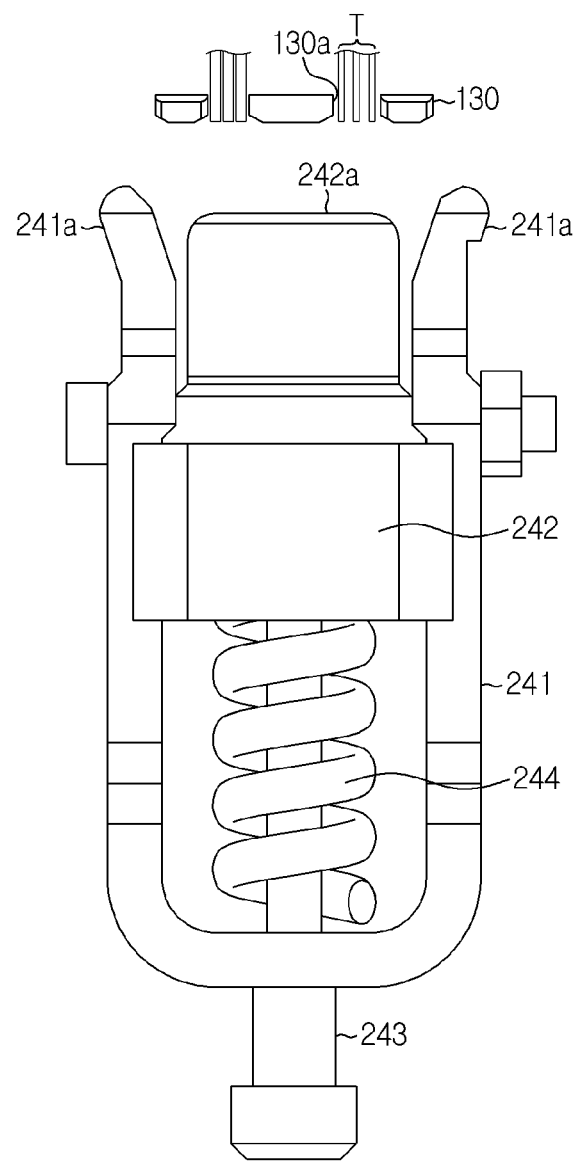
FIGS. 9 to 11 diagrams showing the pressing unit, the bus bar and the electrode lead applied in the present disclosure for illustrating a process where the bus bar is pressed by the pressing unit.
Figure 10:
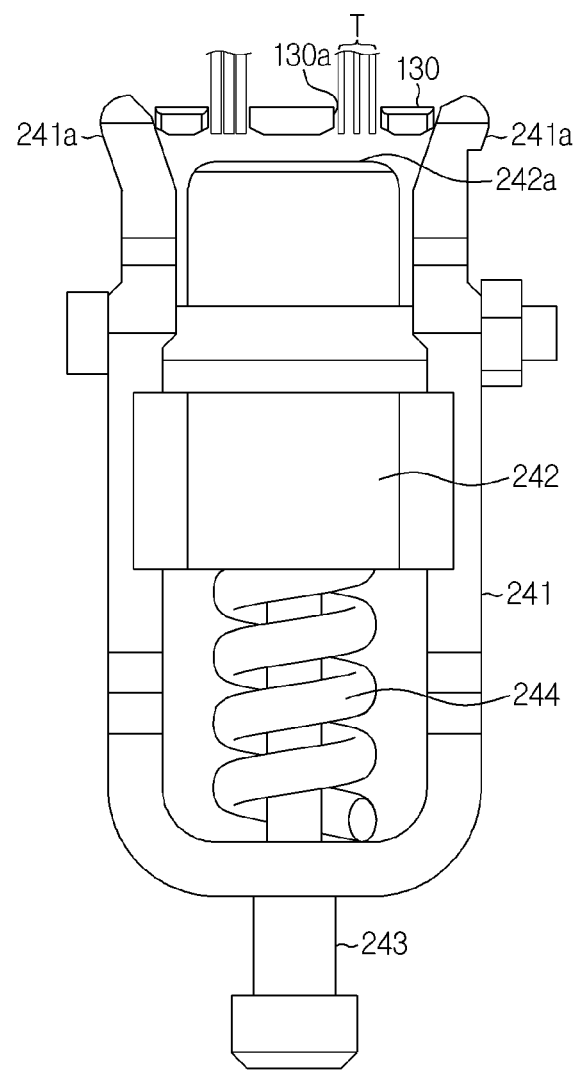
Figure 11:
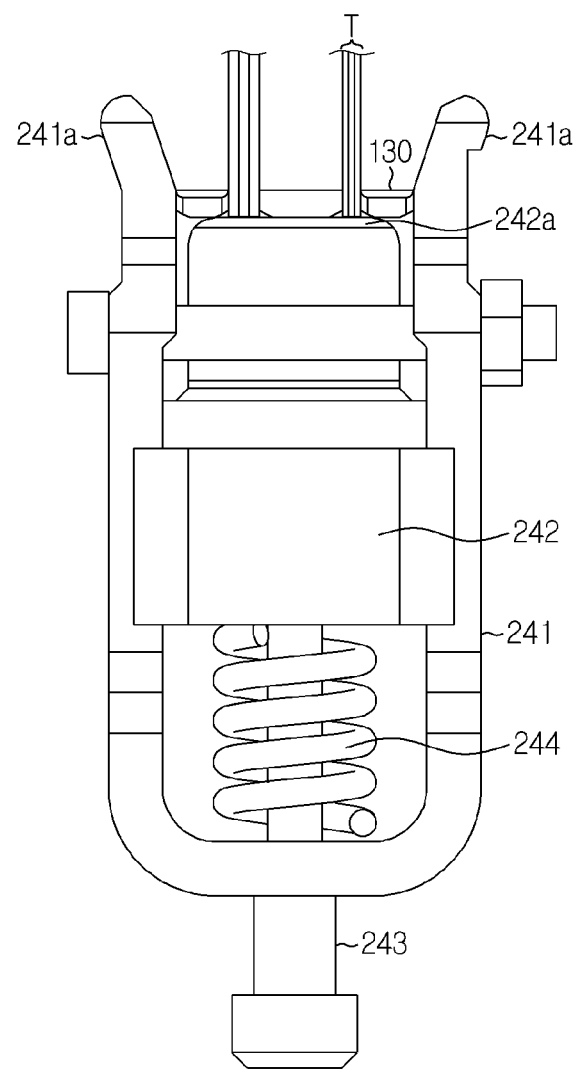

The lead assemblies T drawn from the same unit cell stack are inserted into a lead slit 130a (see FIG. 9) formed in the bus bar 130 and closely adhered to the bus bar 130 when the bus bar 130 is pressed by the automatic pressing jig apparatus 200.

The automatic pressing jig apparatus 200 is disposed at one side of the battery module 100 and presses the bus bar 130 so that the bus bar 130 and the electrode lead 111a are closely adhered to each other. The automatic pressing jig apparatus 200 may include a distance adjusting unit 210, a support plate 220 and a pressing unit 240, and may further include an insulating plate 230 for electrical insulation.

The distance adjusting unit 210 is connected to the support plate 220 to move the support plate 220 so that a plurality of the pressing units 240 are moved away from or closer to the battery module 100.

The distance adjusting unit 210 is not limited as long as it is automatically or manually operated to move the pressing unit 240 up and down by means of the support plate 220 connected to the distance adjusting unit 210.

As an example of the distance adjusting unit 210, an actuator that reciprocates a piston may be applied. The distance adjusting unit 210 of the actuator type includes, for example, a cylinder 211, a piston 212 inserted into the cylinder 211 and moving up and down closer to or away from the battery module 100, and a connection plate 213 formed at one end portion of the piston 212.

If the distance adjusting unit 210 has the above structure, the support plate 220 is attached to the connection plate 213, and thus the support plate 220 is moved up and down closer to or away from the battery module 100 by the up and down movement of the piston 212.

The distance adjusting unit 210 may be provided at one side and the other side of the support plate 220 in a length direction (namely, in a transverse direction on the figure), respectively. In this case, compared to the case where only one distance adjusting unit 210 is provided, the distance adjusting unit 210 and the support plate 220 may be coupled more stably.

One side of the support plate 220 is connected to one end portion of the pressing unit 240 to support and fix the plurality of pressing units 240, and the other side of the support plate 220 is connected to one end portion of the distance adjusting unit 210 to move together with the movement of the distance adjusting unit 210, so that the pressing unit 240 is moved closer to or away from the battery module 100.

The plurality of pressing units 240 are connected to the distance adjusting unit 210 through the support plate 220 and move closer to or away from the battery module 100 according to the movement of the distance adjusting unit 210.

When the distance adjusting unit 210 moves downward, the plurality of pressing units 240 are moved toward the battery module 100 to simultaneously press the plurality of bus bars 130 provided at the battery module 100 and press the end portion of the electrode lead 111a at an upper portion of the bus bar 130 so that the electrode lead 111a does not protrude out of the surface of the bus bar 130.

The specific structure of the pressing unit 240 and the specific pressing mechanism for the bus bar 130 will be described later in detail.

The detailed structure and pressing operation of the pressing unit 240 applied to the present disclosure will be described in detail with reference to FIGS. 6 to 12.

Figure 6:
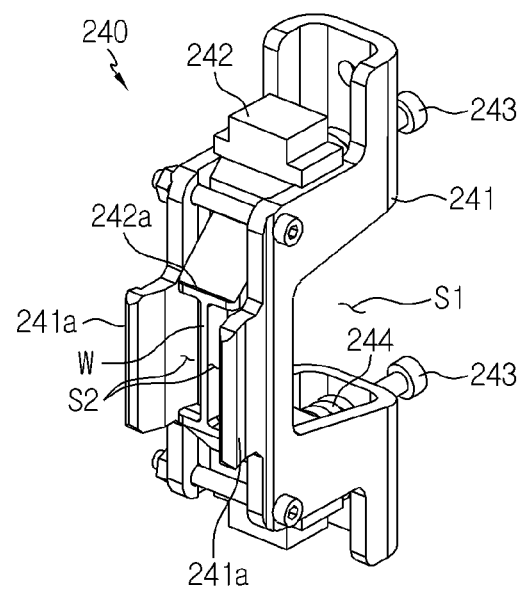
FIGS. 6 and 7 are diagrams showing a pressing unit, employed at the automatic pressing jig apparatus according to an embodiment of the present disclosure.
Figure 7:
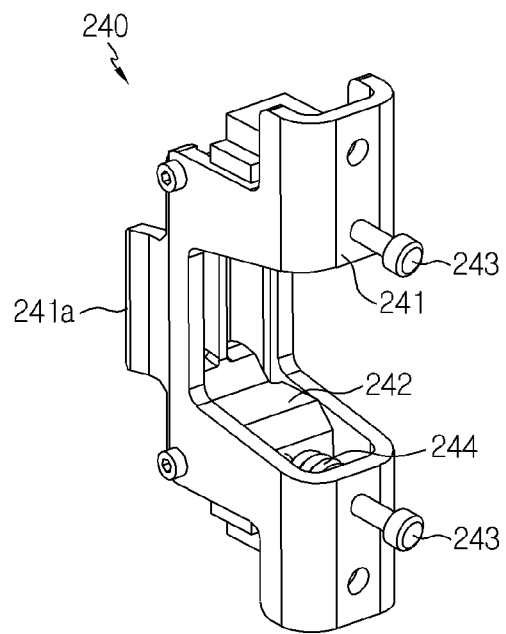
Figure 8:
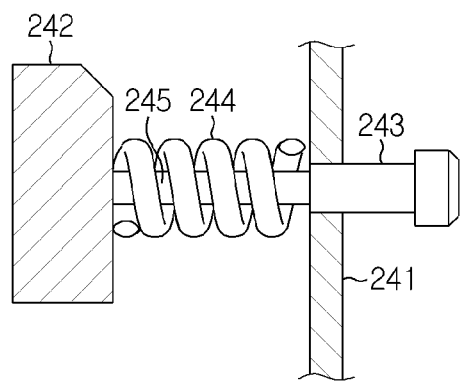
FIG. 8 is a partial cross-sectioned view showing the pressing unit for illustrating relative movements of the support frame and the pressing frame applied in the present disclosure.
Figure 12:
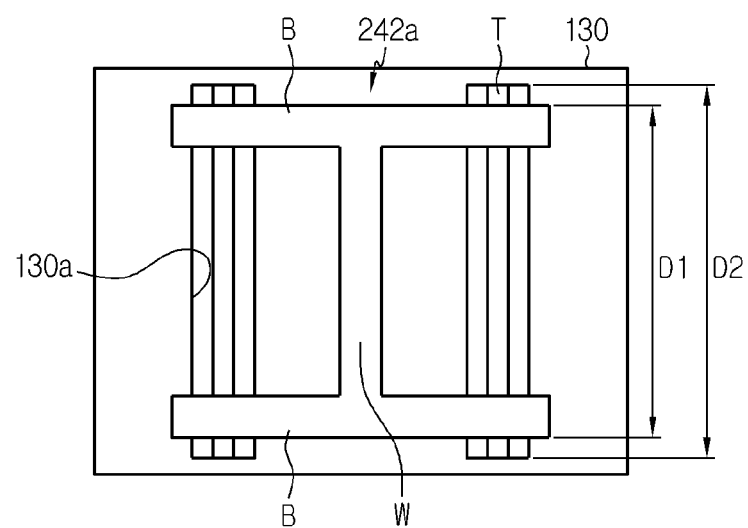
FIG. 12 is a diagram showing that a lead assembly is pressed by a lead pressing portion formed at an end portion of the pressing frame applied in the present disclosure without protruding out of a lead slit formed at the bus bar.

FIGS. 6 and 7 are diagrams showing a pressing unit, employed at the automatic pressing jig apparatus according to an embodiment of the present disclosure, and FIG. 8 is a partial cross-sectioned view showing the pressing unit for illustrating relative movements of the support frame and the pressing frame applied in the present disclosure. Also, FIGS. 9 to 11 diagrams showing the pressing unit, the bus bar and the electrode lead applied in the present disclosure for illustrating a process where the bus bar is pressed by the pressing unit. In addition, FIG. 12 is a diagram showing that a lead assembly is pressed by a lead pressing portion formed at an end portion of the pressing frame applied in the present disclosure without protruding out of a lead slit formed at the bus bar.

Referring to FIGS. 6 to 12, the pressing unit 240 applied to the automatic pressing jig apparatus 200 according to an embodiment of the present disclosure may include a support frame 241, a pressing frame 242, a fixing rod 243, an elastic member 244, and an insert rod 245.

The support frame 241 is a component that moves downward by the movement of the distance adjusting unit 210 to press the bus bar 130 at both sides thereof. The support frame 241 is fixed to the support plate 220 by the fixing rod 243.

The support frame 241 has a pair of bus bar pressing portions 241a for pressing the bus bar 130 at both sides thereof when the support frame 220 moves downward, namely toward the bus bar 130 provided in the battery module 100, by the movement of the distance adjusting unit 210.

The bus bar pressing portion 241a has a tapered shape so that a distance between the pair of bus bar pressing portions 241a decreases in an upper direction, namely in a direction toward the support plate 220 from the bus bar 130. That is, the distance between the pair of bus bar pressing portions 241a corresponds to the length of the bus bar 130 at the end portion of the bus bar pressing portion 241a, but the distance between the pair of bus bar pressing portions 241a gradually decreases in a direction toward the support plate 220.

Due to the above shape, the bus bar pressing portion 241a may press the bus bar 130 more strongly when the pressing unit 240 contacts the bus bar 130 and then moves downward. In view of the above pressing principle, the support frame 241 is preferably made of a material with excellent elasticity, for example a metal such as aluminum.

The pressing frame 242 is located inside the support frame 241 and moves downward together with the support frame 241 by the distance adjusting unit 210 to press the lead assembly T formed by collecting the electrode leads 111a from the upper portion of the bus bar 130.

In order to press the lead assembly T, the pressing frame 242 has a lead pressing portion 242a formed at a lower end portion thereof and thus presses the lead assembly T from the above when being moved downward toward the bus bar 130.

Meanwhile, the support frame 241 has a first opening S1 formed through a center thereof, and the pressing frame 242 has a pair of second openings S2 communicating with the first opening S1. The pair of second openings S2 are formed at a portion of the lead pressing portion 242a that faces the lead assembly T, and the pair of second opening S2 are separated by a barrier W.

That is, a portion of the pressing frame 242 that is in contact with the lead assembly T has an H beam shape, and the pair of openings S2 located on both sides of the barrier W having the H beam shape are formed at locations corresponding to the lead assembly T inserted into the lead slit 130a formed at the bus bar 130.

Specifically, referring to FIG. 12, the lead pressing portion 242a includes a pair of horizontal bars B spaced apart from each other and extending in parallel, and a barrier W connecting centers of the pair of horizontal bars B. The horizontal bar B and the barrier W extend substantially perpendicular to each other, and thus the pressing frame 242 has an H beam shape.

The distance D1 between the outer edge portions of the pair of horizontal bars B is formed to be equal to or shorter than the width D2 of the lead assembly T, namely the length D2 of the lead slit 130a. This is to allow the horizontal bar B of the lead pressing portion 242a to contact the lead assembly T when the pressing frame 242 moves downward toward the bus bar 130.

Both end portions of the pair of horizontal bars B in the length direction press both end portions of the lead assembly T in the width direction.

In this way, the horizontal bar B presses the lead assembly T from the upper portion thereof so that the lead assembly T does not protrude out of the lead slit 130a. In this state, a laser beam is irradiated or a welding rod approaches through the pair of second openings S2 formed at both sides of the barrier W based on the center thereof, thereby welding the lead assembly T and the bus bar 130 to each other.

That is, the formation of the openings S1, S2 gives a space through which a welding rod or a laser beam for performing welding to bond the bus bar 130 and the lead assembly T is accessible toward the lead assembly T from the upper portion of the pressing unit 240. In order to allow a welding rod or a laser beam to be accessible, the support plates 220 and the insulating plate 230 may have open holes 220a, 230a (see FIG. 3), respectively, at locations corresponding to the openings S1, S2.

One side of the fixing rod 243 is coupled through the support frame 241, and the other side of the fixing rod 243 is connected to the support plate 220. Thus, the support frame 241 may move along with the support plate 220 according to the movement of the distance adjusting unit 210. One or more pairs of fixing rods 243 may be provided to support the support frame 241 at various locations, which may provide structural stability.

One side of the insert rod 245 is connected to the upper portion of the pressing frame 242, and the other side of the insert rod 245 is inserted into the fixing rod 243. That is, the fixing rod 243 guides movement of the insert rod 245, so that the support frame 241 and the pressing frame 242 may move independently from each other.

The elastic member 244 is, for example, a coil spring, and is interposed between the support frame 241 and the pressing frame 242 to surround the insert rod 245. The elastic member 244 starts to be compressed when the pressing unit 240 moves downward and the pressing frame 242 contacts the upper surface of the bus bar 130. Due to the elastic restoring force of the compressed elastic member 244, the lead assembly T is pressed by the pressing frame 242 not to protrude on the upper surface of the bus bar 130.

As described above, the automatic pressing jig apparatus according to an embodiment of the present disclosure is configured to press the bus bar 130 at both sides thereof and simultaneously press the lead assembly T from the upper surface of the bus bar 130 by using the pressing unit 240. If the automatic pressing jig apparatus according to an embodiment of the present disclosure configured as above is used, a reliable contact between the bus bar 130 and the lead assembly T is ensured, and the bus bar 130 and the lead assembly T are welded to each other in a state where the lead assembly T does not protrude from the surface of the bus bar 130, namely where the end portion of the lead assembly T and the bus bar 130 are positioned on the same plane, thereby improving the welding quality. In addition, since the process of bending the electrode lead may be omitted, the tack time of the process may be reduced.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An automatic pressing jig apparatus for closely adhering a bus bar and a lead assembly provided in a battery module to each other, the automatic pressing jig apparatus comprising:
    a plurality of pressers configured to simultaneously press a plurality of bus bars provided in the battery module, the plurality of pressers pressing an end portion of the lead assembly from an upper portion of the bus bar among the plurality of bus bars so that the lead assembly does not protrude through a lead slit of the bus bar;
    a support plate connected to one end portion of the plurality of pressers to support the plurality of pressers; and
    a distance adjuster connected to the support plate to move the support plate so that the plurality of pressers are moved away from or closer to the battery module.

2. The automatic pressing jig apparatus according to claim 1, further comprising:
    an insulating plate interposed between the support plate and the plurality of pressers.

3. The automatic pressing apparatus according to claim 1, wherein each presser includes:
    a support frame configured to move downward by the distance adjuster to press the bus bar at opposite sides thereof; and
    a pressing frame located inside the support frame and configured to move downward along with the support frame by the distance adjuster to press the end portion of the lead assembly protruding through the lead slit of the bus bar.

4. The automatic pressing jig apparatus according to claim 3, wherein each presser further includes an elastic member interposed between the support frame and the pressing frame to maintain a distance between the pressing frame and the support frame, the elastic member being compressed when the pressing frame presses the lead assembly.

5. The automatic pressing jig apparatus according to claim 4, further comprising:
    a fixing rod having one side coupled through the support frame and another side connected to the support plate; and
    a guide rod having one side connected to the pressing frame and another side inserted into the fixing rod to guide a movement of the elastic member.

6. The automatic pressing jig apparatus according to claim 3, wherein the support frame includes a pair of bus bar pressing portions configured to press the bus bar at opposite sides thereof when the support frame moves downward due to a movement of the distance adjuster.

7. The automatic pressing jig apparatus according to claim 6, wherein the pair of bus bar pressing portions have a tapered shape so that a distance between the pair of bus bar pressing portions decreases in an upper direction thereof.

8. The automatic pressing jig apparatus according to claim 3, wherein the pressing frame includes a lead pressing portion configured to press the lead assembly from the above so that the lead assembly does not protrude through the lead slit of the bus bar when the pressing frame moves downward due to a movement of the distance adjuster.

9. The automatic pressing jig apparatus according to claim 3, wherein the support frame has a first opening formed through a center thereof, and wherein the pressing frame has a second opening formed at a location corresponding to the lead assembly and communicating with the first opening.

10. The automatic pressing jig apparatus according to claim 8, wherein the lead pressing portion includes a pair of horizontal bars spaced apart from each other and extending in parallel and a barrier configured to connect centers of the pair of horizontal bars, and wherein the pair of horizontal bars press the lead assembly.

11. The automatic pressing jig apparatus according to claim 10, wherein a distance between outer edge portions of the pair of horizontal bars is identical to or shorter than a width of the lead assembly.

\* \* \* \* \*